(12) United States Patent (10) Patent No.: US 7,970,359 B2
Doubchak et al. (45) Date of Patent: Jun. 28, 2011

(54) DELAY DIVERSITY IN ANTENNA ARRAYS

(75) Inventors: Ariel Doubchak, Tel Aviv (IL); Danny Stopler, Holon (IL); Rafael Halfon, Givataim (IL)

(73) Assignee: Alvarion Ltd., Tel Aviv (IL)

( * ) Notice: Subject to any disclaimer, the term of this patent is extended or adjusted under 35 U.S.C. 154(b) by 546 days.

(21) Appl. No.: 12/181,619

(22) Filed: Jul. 29, 2008

(65) Prior Publication Data

US 2010/0029222 A1 Feb. 4, 2010

(51) Int. Cl.
*H04B 1/02* (2006.01)
*H04M 1/00* (2006.01)
(52) U.S. Cl. ............... 455/101; 455/562.1; 455/63.4
(58) Field of Classification Search ............. 455/63.4, 455/562.1, 121, 269, 561, 101, 91; 343/844, 343/835

See application file for complete search history.

(56) References Cited

U.S. PATENT DOCUMENTS

| | | | |
|---|---|---|---|
| 4,467,328 A * | 8/1984 | Hacker | 342/14 |
| 6,597,678 B1 * | 7/2003 | Kuwahara et al. | 370/342 |
| 6,895,230 B1 * | 5/2005 | Blount et al. | 455/276.1 |
| 6,900,775 B2 * | 5/2005 | Shapira | 343/844 |
| 7,082,321 B2 * | 7/2006 | Kuwahara et al. | 455/562.1 |
| 7,203,462 B2 * | 4/2007 | Kuwahara et al. | 455/67.14 |
| 7,587,174 B2 * | 9/2009 | Kuwahara et al. | 455/67.16 |
| 2005/0195763 A1 | 9/2005 | Kadous et al. | |
| 2006/0168165 A1 | 7/2006 | Boss et al. | |
| 2007/0037528 A1 | 2/2007 | Doan et al. | |
| 2007/0205943 A1 | 9/2007 | Nassiri-Toussi et al. | |
| 2007/0224951 A1 | 9/2007 | Gilb et al. | |
| 2008/0144738 A1 | 6/2008 | Naguib | |

FOREIGN PATENT DOCUMENTS

| | | |
|---|---|---|
| WO | W003075469 A2 | 9/2003 |
| WO | WO-2007021891 | 2/2007 |
| WO | WO-2007095328 | 8/2007 |
| WO | WO-2007095354 | 8/2007 |
| WO | WO-2007112063 | 10/2007 |

OTHER PUBLICATIONS

Dammann et al., "Beamforming in combination with space-time diversity for broadbank OFDM systems" Proceedings of IEEE International Conference on Communications—Apr. 28-May 2, 2002—New York, NY, USA, IEEE, Piscataway, NJ USA, vol. 1, Apr. 28, 2000, pp. 165-171, XP010589479 ISBN: 978-0-7803-7400-3.

* cited by examiner

*Primary Examiner* — Sonny Trinh
(74) *Attorney, Agent, or Firm* — Abraham Hershkovitz; Harold L. Novick; Hershkovitz & Associates, LLC

(57) ABSTRACT

In a wireless transmission system including a transmit delay module, delaying each of at least one copy of a signal by a respective delay, the signal being transmitted over a plurality of carrier frequencies and over at least one beam, the at least one beam exhibiting a beam pattern, the number of copies of the signal corresponding to the number of beams, each the at least one copy being associated with a respective one of the at least one beam, the system further including a beam pattern former, coupled with the transmit delay module, producing a plurality of transmit signals corresponding to the beam pattern, a frequency dependent beam shifter, coupled with the beam pattern former, delaying each of the at least one transmit signal by a respective angular shift delay, thereby applying an angular shift to each of the at least one beam, the angular shift of each of the at least one beam corresponding to at least a respective one of the carrier frequencies, wherein each beam is transmitted with a delay corresponding to the transmit delay of each the copy.

26 Claims, 12 Drawing Sheets

DELAY DIVERSITY IN ANTENNA ARRAYS

FIELD OF THE DISCLOSED TECHNIQUE

The disclosed technique relates to wireless communications, in general, and to methods and systems for employing delay diversity in antenna arrays, in particular.

BACKGROUND OF THE DISCLOSED TECHNIQUE

Communication channels (e.g., wireless, wired and optical), especially wireless channels, exhibit noise which decreases the reliability of the received signal (i.e., the transmit signal is not correctly received at the receiver). Techniques known in the art to increase the reliability of the received signal include Forward Error Corrections (FEC), equalization and transmission diversity. Transmission diversity includes time diversity, delay diversity, frequency diversity and space diversity. In space diversity, copies of the transmit signal propagated via different paths toward the receiver. The receiver combines these copies to increase the received signal power. In frequency diversity, copies of the information signal are modulated over a number of different carrier frequencies. The receiver receives each of the modulated carrier frequencies and combines the received signals. According to the delay diversity technique, a transmitter transmits the same signal several times, each time at a different time-delay. When a transmitter employs a single antenna the antenna transmits the signal over an omni-directional beam of an electromagnetic wave and the transmitter transmits delayed versions of the signal via the single antenna. The transmitter may employ a plurality of antennas (i.e., an array of antennas), and transmit the signal via the antennas, at a time-delay associated with each antenna. When the transmitter transmits the signal via the antennas, at the time-delay associated with each antenna, and the transmissions of the delayed signal overlap, the frequency response of the communication channel (i.e., the attenuation and the phase shift of the channel caused by interference in the channel at different frequencies) may attenuate at certain frequencies where the delayed transmitted signals destructively interfere with each other (i.e., the channel is a frequency selective channel). Furthermore, the time-delay between the transmitted signals (i.e., the signals transmitted by each of the antennas) introduces a phase-shift between the transmitted signals. Thus, instead of an omni-directional beam of an electromagnetic wave, created when a single antenna is used, the antennas create beams which exhibit spatial directionality. This directionality is a result of the destructive and constructive interference of the transmitted signals in space (i.e., similar to a diffraction pattern of a plurality of point light sources). In general, the maximum number of beams produced corresponds to the number of antennas. The number of beams together with the direction, width and length of the beams is referred to herein as the 'beam pattern'. Due to the spatial directionality of the beams, two receivers for example, located at two different spatial locations relative to the transmitting antennas, may receive the transmitted signal at different received levels of power.

As mentioned above, the direction of the beams is determined according to the relative time-delay or, alternatively, the relative phase-shift between the transmitted signals.

Reference is now made to FIGS. 1A, 1B and 1C. FIGS. 1A and 1B are schematic illustrations of two signals 10 and 12 respectively, with a time difference $\Delta T$ there between. FIG. 1C is a schematic illustration of an exemplary transmitter, generally referenced 20, for transmitting a signal using delay diversity. Transmitter 20 includes two antennas 22 and 24 and a beam former 30. Beam former 30 includes two delays 26 and 28. Antenna 22 is coupled with delay 26 and antenna 24 is coupled with delay 28. A signal X is provided to delay 26 and to delay 28. Delay 26 delays signal X by $T_0$ (e.g., $T_0$ is equal to zero in FIG. 1A). Delay 28 delays signal X by $T_1$ wherein $T_1-T_0=\Delta T$ (e.g., $T_1$ is equal to $\Delta T$ in FIG. 1B). Antenna 22 transmits the signal delayed by $T_0$ and antenna 24 transmits the signal delayed by $T_1$. As a result of delays introduced to signal X by delays 26 and 28 of beam former 30, the signals transmitted by each antenna undergo constructive and destructive interference. Consequently, system 20 transmits the signal over a beam 32 of electromagnetic waves, where beam 32 exhibits spatial directionality. The direction of beam 32 is determined according to $\Delta T$ and the transmitted frequency. Furthermore, beam 32 may exhibit attenuation at certain transmitted frequencies. It is noted that, in fact, system 20 produces two beams, directed in opposite directions however, only one beam is depicted in FIG. 1C.

U.S. Patent application publication 2006/0168165, to van Nee, entitled "Delay Diversity and Spatial Rotation Systems and Methods" is directed towards a system and a method for combining delay diversity and spatial rotation. The system directed to by van Nee includes a Forward Error Correction (FEC) encoder, a puncture module, a spatial stream parser, a plurality of interleavers and a plurality of modulators. The system disclosed by van Nee further includes a cyclic delay module, a Walsh matrix operator, a plurality of Inverse Fast Fourier Transform (IFFT) modules, a plurality of RF/analog modules and a plurality of antennas. Each antenna is coupled with a respective RF/analog module. Each IFFT module is coupled with a respective RF/analog module and with the Walsh matrix operator. The cyclic delay module is coupled with the Walsh matrix operator and with each of the modulators. Each frequency interleaver is coupled with a respective modulator and with the spatial stream parser. The puncture module is coupled with the spatial stream parser and with the FEC encoder.

An input data stream is provided to the FEC encoder which encodes the input data stream to create codewords. The puncture module removes redundant bits from the encoded data stream. The spatial stream parser separates the input data stream into a number of spatial streams. Each frequency interleaver re-orders the bits of the spatial streams such that the transmitted spatial streams are not mirror images of each other. Each modulator modulates the interleaved spatial stream provided by the respective frequency interleaver coupled thereto.

The cyclic delay module introduces to each spatial stream a cyclic delay. The output of the delay modules are cyclically delayed spatial streams. The number of cyclically delayed spatial streams may be different from the number of spatial streams at the input of the cyclic delay module. The Walsh matrix operator introduces a spatial rotation for each cyclically delayed spatial stream thereby mapping each delayed spatial stream to a transmit signal. The IFFT modules combine spatial streams and the sub-carriers into time-domain signals which are used by the RF/analog modules for transmissions by the antennas.

SUMMARY OF THE PRESENT DISCLOSED TECHNIQUE

It is an object of the disclosed technique to provide a novel method and system for employing delay diversity in antenna arrays. In accordance with the disclosed technique, in a wireless transmission system which includes a transmit delay module coupled with a beam pattern former there is thus provided a frequency dependent beam shifter, coupled with the beam pattern former. The transmit delay module delays each of at least one copy of a signal by a respective delay. The signal is transmitted over a plurality of carrier frequencies and over at least one beam. The at least one beam exhibits a beam pattern. The number of copies of the signal corresponds to the number of beams. Each of the at least one copy is associated with a respective one of the at least one beam. The beam pattern former produces a plurality of transmit signals corresponding to the beam pattern. The frequency dependent beam shifter delays each of the at least one transmit signal by a respective angular shift delay. Thereby, the frequency dependent beam shifter applies an angular shift to each of the at least one beam. The angular shift of each of the at least one beam corresponds to at least a respective one of the carrier frequencies. Each beam is transmitted with a delay corresponding to the transmit delay of each copy.

In accordance with another aspect of the disclosed technique, there is thus provided a wireless transmission system. The wireless transmission system includes a transmit delay module, a beam pattern former and a frequency dependent beam shifter. The beam pattern former is coupled with the transmit delay module and with the frequency dependent beam shifter. The transmit delay module delays each of at least one copy of a signal by a respective delay. The signal is transmitted over a plurality of carrier frequencies and over at least one beam. The at least one beam exhibits a beam pattern. The number of copies of the signal corresponds to the number of beams. Each the at least one copy is associated with a respective one of the at least one beam. The beam pattern former produces a plurality of transmit signals corresponding to the beam pattern. The frequency dependent beam shifter delays each of the transmit signals by a respective angular shift delay. Thereby, the frequency dependent beam shifter applies an angular shift to each of the at least one beam. The angular shift of each of the at least one beam corresponds to at least a respective one of the carrier frequencies. Each beam is transmitted with a delay corresponding to the transmit delay of each copy.

In accordance with a further aspect of the disclosed technique, there is thus provided a method for transmitting a signal over a plurality of carrier frequencies and a plurality of beams. The beams exhibits a beam pattern, the method comprising the procedures of delaying each copy of the signal by a corresponding transmit delay and applying a beam forming matrix to the delayed copies of the signal, thereby producing transmit signals corresponding to the beam pattern. Each transmit signal being associated with at least one carrier frequency. The method further includes the procedure of delaying each of the transmit signals by a respective angular shift delay, thereby applying an angular shift to each beam in the beam pattern. The angular shift of each beam corresponds to each carrier frequency.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for introducing delay diversity in transmitters employing antenna arrays which transmit according to wide-band multi-carrier transmission schemes (e.g., Wi-Fi, WCDMA, UMTS) while reducing channel selectivity (i.e., reducing the frequency bands whereat the channel attenuates the transmitted signal). In multi-carrier transmission schemes, the transmission bandwidth includes a plurality of narrow band sub-carriers. The sub-carriers are modulated by the modulating symbols intended for transmission (e.g., synchronization symbols, data symbols). The term 'signal' refers herein to an electromagnetic signal transmitted by a transmitter (e.g., a synchronization signal, a data signal). In multi-carrier transmission schemes, the signal is an aggregation of the plurality of the sub-carriers. The parameters characterizing multi-carrier transmission schemes include two time parameters. The first time parameter is the symbol period (i.e., determined according to the Fourier transform interval of the multi-carrier transmission scheme), which is inversely proportional to the sub-carrier bandwidth. The second time parameter is the signal sample period (i.e., determined according to the minimum Nyquist sampling rate), which is inversely proportional to the bandwidth of the signal.

The system according to the disclosed technique transmits copies of the signal over a plurality of beams. A beam former determines the spatial directionality of each beam. Thus, each beam exhibits corresponding spatial directionality. A transmit delay module delays each copy of the signal prior to it being provided to the beam former. Thus, each beam is associated with a respective time delay. Furthermore, a frequency dependent beam shifter delays the signals produced by the beam pattern former. This delay, referred to herein as 'angular shift delay', produces an angular shift in the direction of each beam. This angular shift depends on the sub-carrier frequency. In other words, the direction of each beam changes according to the sub-carrier frequency. Thus, each beam is directed toward a corresponding direction at a respective time delay. This direction is associated with a respective carrier frequency. Thus, the average transmission power of the signal is isotropic. Both of the above mentioned delays may be replaced with a phase shifter. Furthermore, the direction corresponding to each beam may be essentially confined in a determined angular sector.

Figure 1A:
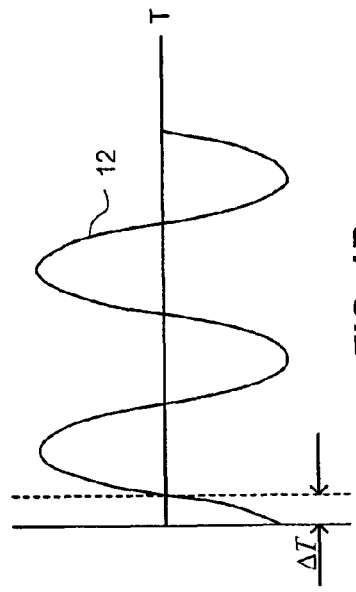
FIGS. 1A and 1B are schematic illustrations of two signals with a time difference there between as known in the art.
Figure 1B:
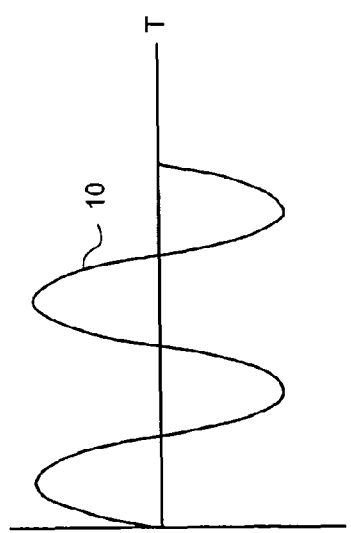
Figure 1C:
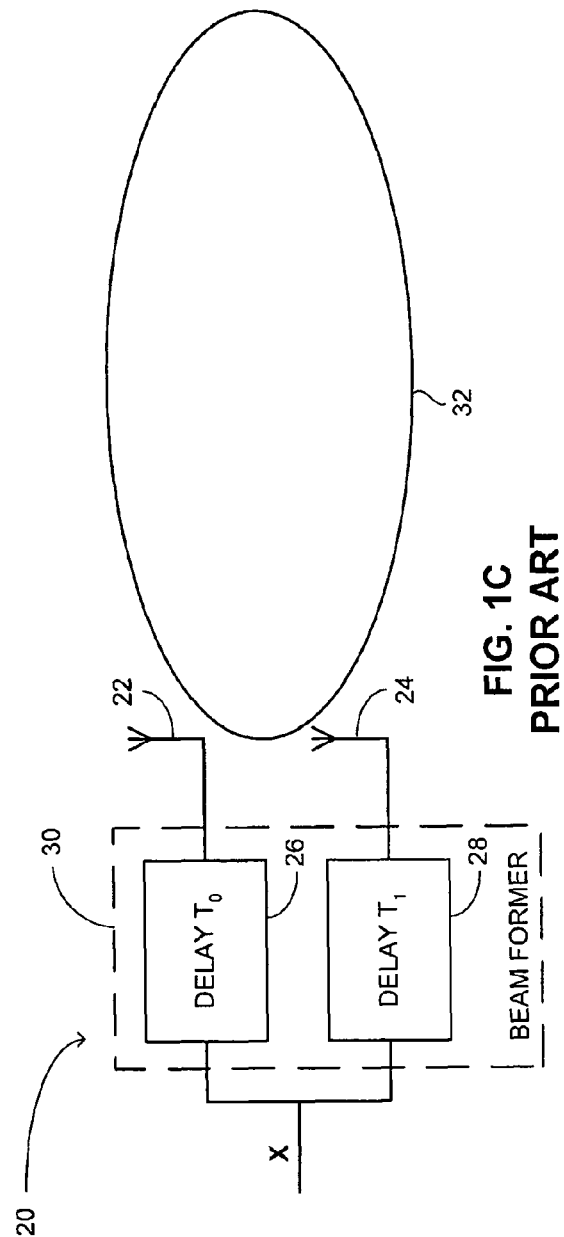
FIG. 1C is a schematic illustration of an exemplary transmitter for transmitting a signal using delay diversity as known in the art.
Figure 2A:
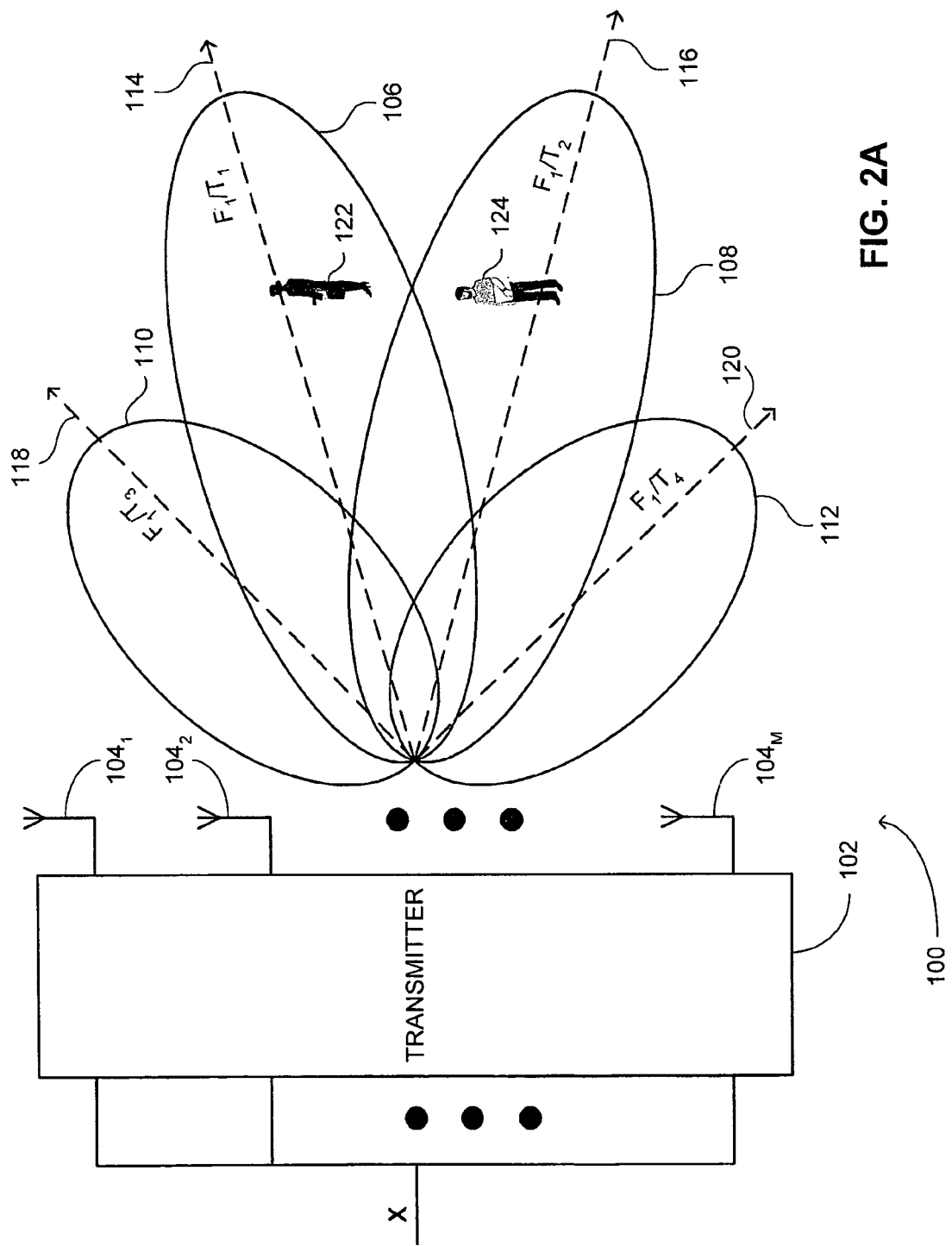
FIGS. 2A, 2B, 2C and 2D are schematic illustrations of a system, constructed and operative in accordance with an embodiment of the disclosed technique.

Reference is now made to FIGS. 2A, 2B, 2C and 2D which are schematic illustrations of a system, generally referenced 100, constructed and operative in accordance with an embodiment of the disclosed technique. System 100 produces beam delay diversity with frequency dependent beam direction shifting, and is operative in accordance with a further embodiment of the disclosed technique. System 100 includes a transmitter 102 coupled with antennas $104_1$, $104_2$ and $104_M$. System 100 transmits a signal X, for example, over four directional beams 106, 108, 110 and 112 using three sub-carrier frequencies $F_1$, $F_2$ and $F_3$. Signal X includes a plurality of symbols, each associated with the same symbol period. Referring to FIG. 2A, transmitter 102 transmits a signal X with a first sub-carrier frequency $F_1$. Transmitter 102 produces beams 106, 108, 110 and 112. Each of beams 106, 108, 110 and 112 is associated with a respective transmit delay. Beam 106 is associated with a transmit delay $T_1$. Beam 108 is associates with a transmit delay $T_2$. Beam 110 is associates with a transmit delay $T_3$ and beam 112 is associated with a transmit delay $T_4$. Furthermore each of beams 106, 108, 110 and 112 is directed towards a corresponding different spatial direction. The direction corresponding to each of beams 106, 108, 110 and 112 is associated with sub-carrier frequency $F_1$. Accordingly, Beam 106 is directed at a direction indicated by an arrow 114. Beam 108 is directed at a direction indicated by an arrow 116. Beam 110 is directed at a direction indicated by an arrow 118. Beam 112 is directed at a direction indicated by an arrow 120. Thus, user 122 receives signal X over beam 106 with delay $T_1$ and user 124 receives signal X over beam 108 with delay $T_2$.

Figure 2B:
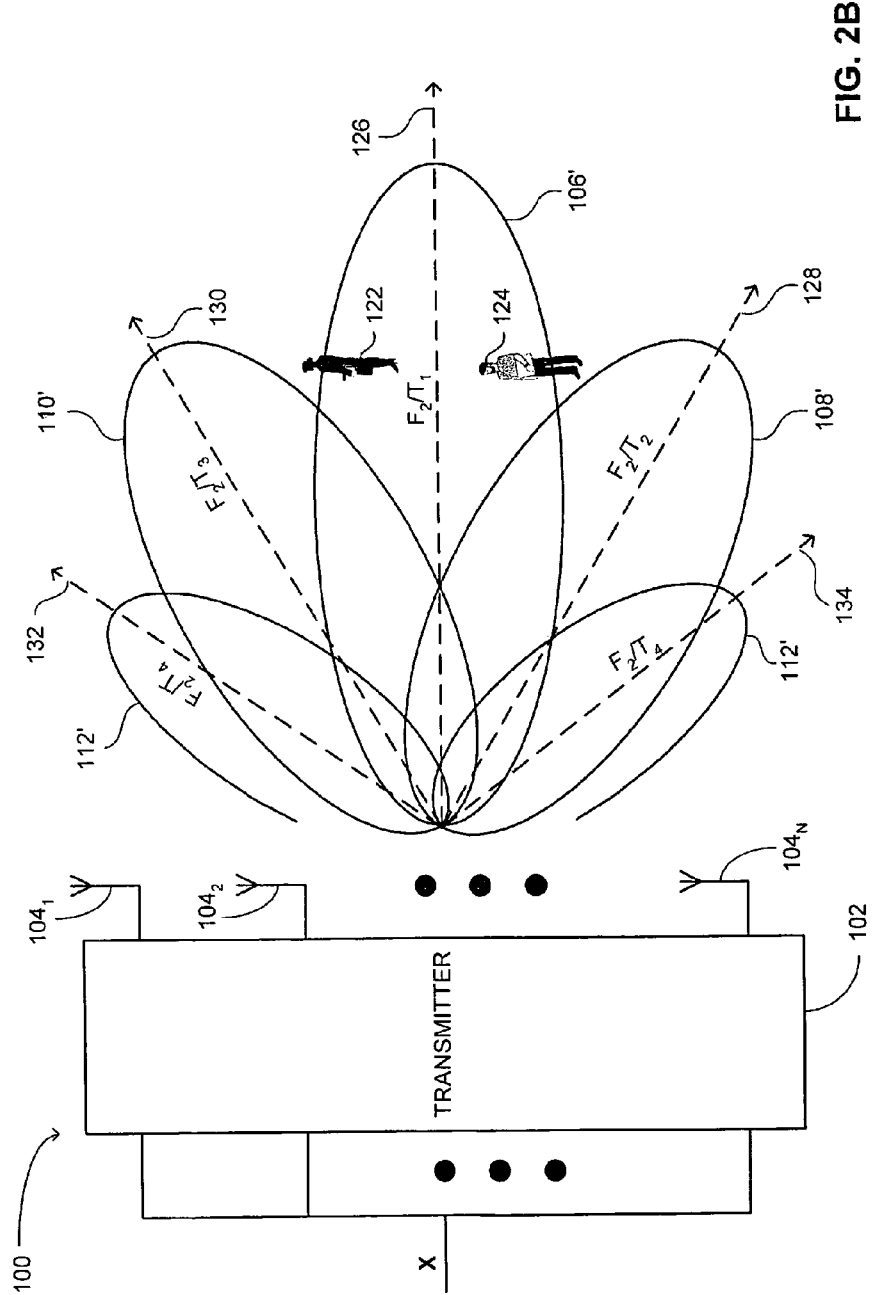
Figure 2C:
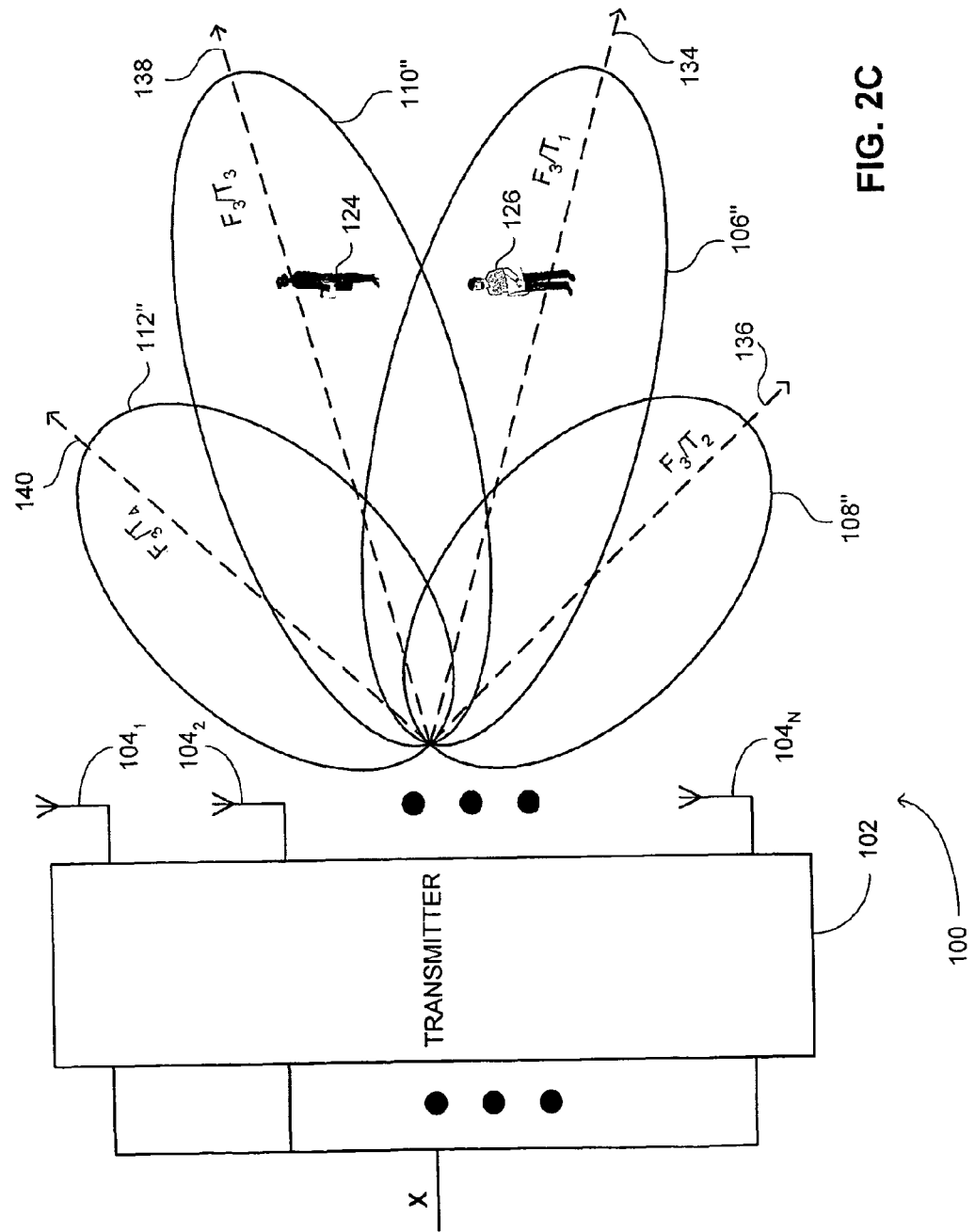

Referring to FIG. 2B, transmitter 102 transmits the signal X with a second sub-carrier frequency $F_2$. Each of beams 106', 108', 110' and 112' is associated with the respective transmit delay. Beam 106' is associated with transmit delay $T_1$. Beam 108' is associates with transmit delay $T_2$. Beam 110' is associates with transmit delay $T_3$ and beam 112' is associated with transmit delay $T_4$. Each of beams 106', 108', 110' and 112' is directed towards a corresponding spatial direction. The direction corresponding to each of beams 106', 108', 110' and 112' is associated with sub-carrier frequency $F_2$. The direction corresponding to each of beams 106', 108', 110' and 112', respective of frequency $F_2$ exhibits an angular shift relative to the direction corresponding to each of beams 106, 108, 110 and 112 respective of frequency $F_1$ (i.e., as depicted in FIG. 2A). Accordingly at sub-carrier frequency $F_2$, beam 106' is directed toward a direction indicated by an arrow 126. Beam 108' is directed toward a direction indicated by an arrow 128. Beam 110' is directed toward a direction indicated by an arrow 130. Beam 112' is directed toward the directions indicated by arrows 132 and 134. Accordingly, users 122 and 124 receive signal X from beam 106 with delay $T_1$. It is noted than beam 112 is divided into two parts due to the cyclic nature of the signal Referring to FIG. 2C, transmitter 102 transmits the signal X with a third sub-carrier frequency $F_3$. Each of beams 106", 108", 110" and 112" is associated with a respective transmit delay. Beam 106" is associated with transmit delay T1. Beam 108" is associates with transmit delay $T_2$. Beam 110" is associated with transmit delay $T_3$ and beam 112" is associated with transmit delay $T_4$. Each of beams 106", 108", 110" and 112" is directed towards a corresponding spatial direction. The direction corresponding to each of beams 106", 108", 110" and 112" is associated with sub-carrier frequency $F_3$. The direction corresponding to each of beams 106", 108", 110" and 112", respective of frequency $F_3$ exhibits an angular shift relative to the direction corresponding to each of beams 106, 108, 110 and 112 respective of frequency $F_1$ (i.e., as depicted in FIG. 2A). Furthermore, direction corresponding to each of beams 106", 108", 110" and 112" exhibits an angular shift relative to the direction corresponding to each of beams 106', 108', 110' and 112' respective of frequency $F_2$ (i.e., as depicted in and 2B). Accordingly, at sub-carrier frequency $F_3$, beam 106" is directed at a direction indicated by an arrow 134. Beam 108" is directed at a direction indicated by an arrow 136. Beam 110" is directed at a direction indicated by an arrow 138. Beam 112" is directed at a direction indicated by an arrow 140. Accordingly, user 122 receives signal X over beam 110 with delay $T_2$ and user 124 receives signal X over beam 106 with delay $T_1$.

Figure 2D:
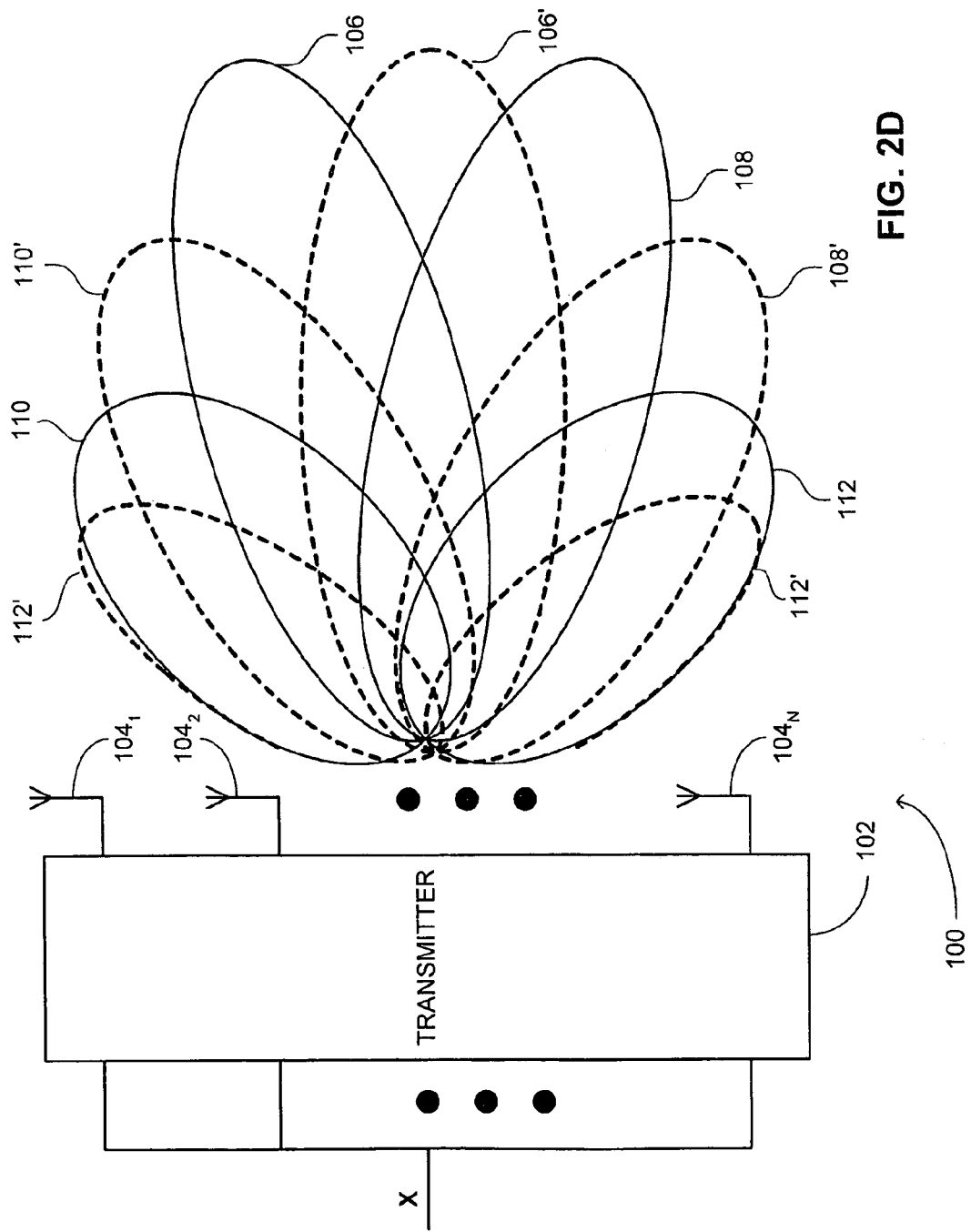

Referring to FIG. 2D, beams 106', 108', 110' and 112' respective of frequency $F_2$ are depicted overlaid on beams 106, 108, 110 and 112 respective of frequency $F_1$. As can be noted from the figure, beams 106', 108', 110' and 112' exhibit an angular shift in the direction there of relative to beams 06, 108, 110 and 112.

Figure 3:
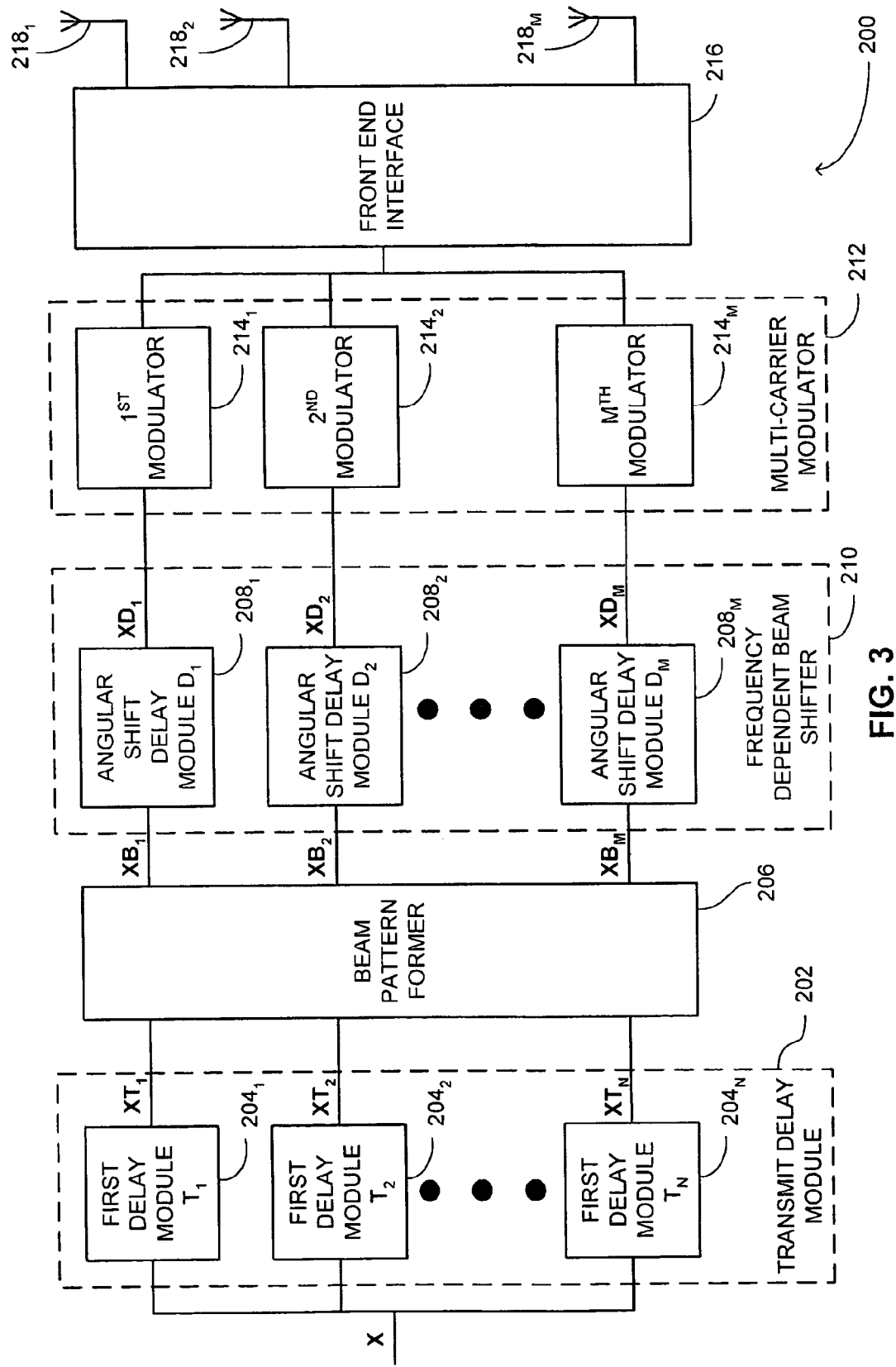
FIG. 3 is a schematic illustration of a system for producing beam delay diversity with frequency dependent beam direction shifting, constructed and operative in accordance with another embodiment of the disclosed technique.

As mentioned above, the beam delay diversity with frequency dependent beam direction shifting, described herein above in conjunction with FIGS. 2A, 2B, 2C and 2D, can be achieved by introducing time delays before and after the beam former. Reference is now made to FIG. 3, which is a schematic illustration of a system, generally referenced 200, for producing beam delay diversity with frequency dependent beam direction shifting, constructed and operative in accordance with another embodiment of the disclosed technique. System 200 includes a transmit delay module 202, a beam pattern former 206, an beam frequency dependent shift former 210, a multi-carrier modulator 212, a front end interface 216 and a plurality of antennas $218_1$-$218_M$. In system 200, transmit delay module 202 includes a plurality of first delay modules $204_1$-$204_N$ where N is the number of beams. Beam frequency dependent shift former 210 includes a plurality of angular shift delay modules $208_1$-$208_M$ (i.e., the number of angular shift delay modules is equal to the number of antennas). Multi-carrier modulator includes a plurality of modulators $214_1$-$214_M$ each associated with a respective sub-carrier frequency. Beam pattern former 206 is coupled with each of first delay modules $204_1$-$204_N$ and with each of angular shift delay modules $208_1$-$208_M$. Front end interface 216 is coupled with each of multi-carrier modulators $214_1$-$214_M$ and with each of antennas $218_1$-$218_M$. Each of angular shift delay modules $208_1$-$208_M$ is further coupled with a corresponding one of multi-carrier modulators $214_1$-$214_M$ (i.e., angular shift delay module $208_1$ is coupled with $1^{st}$ modulator $214_1$, angular shift delay module $208_2$ is coupled with $2^{nd}$ modulator $214_2$ etc.).

A signal X is provided to each of first delay modules $204_1$-$204_N$. Signal X includes a plurality of symbols, each associated with the same symbol period. Each of first delay modules $204_1$-$204_N$ delays signal X by a respective first time delay $T_1$-$T_N$. Each of delays $204_1$-$204_N$ produces a corresponding signal $XT_1$-$XT_N$. Signals $XT_1$-$XT_N$ are delayed copies of signal X. In general, the number of delays corresponds to the number of beams and each copy is associated with a respective beam. Thus, each beam is associated with a respective time delay. Furthermore, the difference between the delays introduced by two adjacent first delays (i.e., $T_n$-$T_{n-1}$) should be as larger as possible. Specifically this difference is determined to be larger than the inverse of the signal bandwidth (i.e., larger than a sample period) as follows:

$$T(n) - T(n-1) > \frac{1}{BW} \quad (1)$$

wherein BW is the bandwidth of the signal.

Each of first delay modules $204_1$-$204_N$ provides the corresponding produced signal thereof to beam pattern former 206. Beam pattern former 206 adjusts the phase (e.g., multiplying by a complex weighting factor) of each of $XT_1$-$XT_N$, and produces transmit signals $XB_1$-$XB_M$. Transmit signals $XB_1$-$XB_M$ correspond to the beam pattern (i.e., the number of beams, the corresponding direction of each beam and the width of each beam). When transmitted, transmit signals $XB_1$-$XB_M$ create the beams, each beam having a corresponding spatial direction and respective time delay. In general beam pattern former 206 may be implemented as a beam forming matrix. For example, for a system with four beams and four antennas the beam forming matrix may be an orthonormal rotation matrix W:

$$W = \frac{1}{2}\begin{bmatrix} 1 & 1 & 1 & 1 \\ 1 & j & -j & -1 \\ 1 & -1 & -1 & 1 \\ 1 & -j & j & -1 \end{bmatrix} \quad (2)$$

wherein j represents a phase shift of $$\frac{\pi}{2}.$$

Beam pattern former 206 provides $XB_1$-$XB_M$ to frequency dependent beam shifter 210. Beam pattern former 206 provides each of $XB_1$-$XB_M$ to a respective one of angular shift delay modules $208_1$-$208_M$ in frequency dependent beam shifter 210. Angular shift delay modules $208_1$-$208_M$ delay each of $XB_1$-$XB_M$ by a respective one of angular shift delays $D_1$-$D_M$, producing delayed transmit signals $XD_1$-$XD_M$. In general, the difference between two adjacent angular shift delays (i.e., $D_n$-$D_{n-1}$) is determined to be on the order of the inverse of the bandwidth in use, as follows:

$$D(n) - D(n-1) \sim \frac{1}{BW} \quad (3)$$

Angular shift delay modules $208_1$-$208_M$ introduce a phase shift to signal respective of the sub-carrier frequency. Thus, an angular shift is applied to each beam according to the sub-carrier frequency. In particular, to direct the beams in one carrier frequency toward a direction not covered by two adjacent beams, transmitted over adjacent sub-carrier frequencies, the difference between two adjacent angular shift delays (i.e., $D_n$-$D_{n-1}$) is determined to be:

$$D(n) - D(n-1) \approx \frac{1}{M*BW} \quad (4)$$

Thus, with reference back to FIGS. 2A and 2B, when beam 106 is transmitted at sub-carrier frequency $F_2$, beam 106 is directed toward the direction indicated by arrow 126 (FIG. 2B) which is not covered by either beam 106 or beam 108 when beams 106 and 108 are transmitted at sub-carrier $F_1$ (FIG. 2A).

Each of angular shift delay modules $208_1$-$208_M$ provide delayed transmit signals $XD_1$-$XD_M$ to the corresponding modulator angular $214_1$-$214_M$ thereof. Each of modulators $214_1$-$214_M$ modulates the respective sub-carrier frequency thereof, with a respective one of delayed transmit signal $XD_1$-$XD_M$. In general, the number of sub-carrier frequencies is not equal to the number of signals. Thus, a delayed transmit signal may modulate a plurality of sub-carriers. Each of modulators $214_1$-$214_M$ of multi-carrier modulator 212 provides the modulated signals to front end interface 216. Front end interface 216 performs operations such as up-conversion, filtering and the like, and transmits the signals via antennas $218_1$-$218_M$. In system 200, as mentioned above, angular shift delay modules $208_1$-$208_M$ introduce a respective time delay $D_1$-$D_M$, to each signal. Time delays $D_1$-$D_M$ introduce phase shifts to each of the modulated signals. Since the sub-carrier frequencies, of each modulated signal is different, the phase shift introduced to each modulated signal will also be different. Thus, the direction of each beam will shift for each sub-carrier relative to the other sub-carriers, according to the phase shift introduced to that sub-carrier. Thus referring back to FIGS. 2A, 2B and 2C, beam 106 is directed at a direction indicated by arrow 114 at sub-carrier $F_1$ (FIG. 2A), at a direction indicated by arrow 126 at sub-carrier $F_2$ (FIG. 2B) and at a direction indicated by arrow 134 at sub-carrier $F_3$ (FIG. 2C). Additionally, beams 106, 108, 110 and 112 maintain their relative positions there between.

It is noted that beam pattern former 206 described hereinabove is not frequency or time dependent. However, beam pattern former 206 and frequency dependent beam shifter 210 may be replaced with a frequency dependent beam former (i.e., each carrier frequency is associated with a corresponding beam pattern former). It is further noted that multi-carrier modulator 212 may be placed before transmit delay module 202.

Figure 4A:
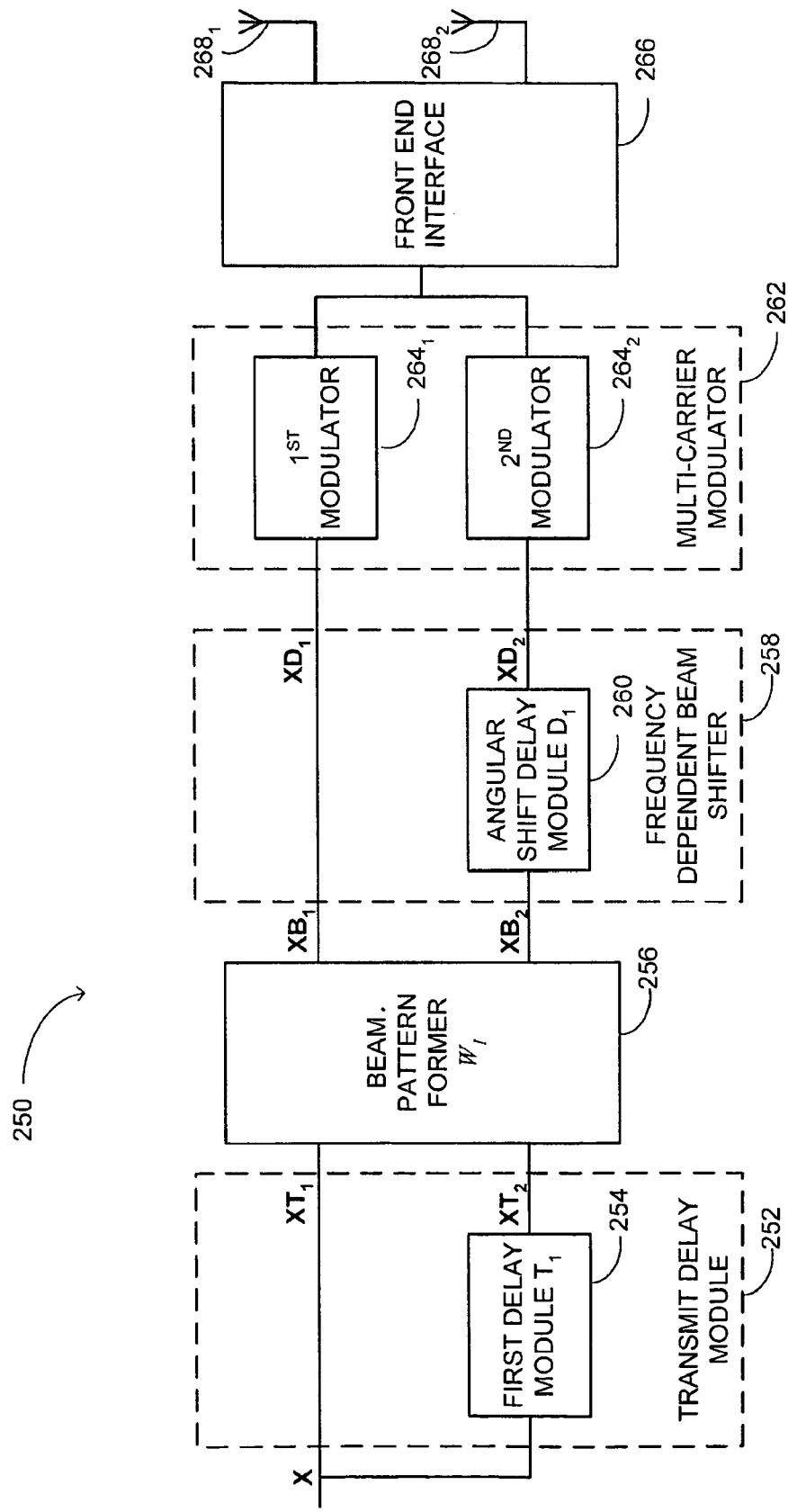
FIG. 4A, is a schematic illustration of an exemplary system for producing beam delay diversity with frequency dependent beam direction shifting, constructed and operative in accordance with a further embodiment of the disclosed technique.

System 200, described hereinabove in conjunction with FIG. 3, time delays signal X to create the spatial delay diversity with carrier frequency dependent beam direction shifting. One exemplary implementation of system 200 (FIG. 3) is using N time-domain filters (i.e., as defined hereinabove—N is the number of beams). Reference is now made to FIG. 4A, which is a schematic illustration of an exemplary system, generally referenced 250, for producing beam delay diversity with frequency dependent beam direction shifting, constructed and operative in accordance with a further embodiment of the disclosed technique. System 250 includes a transmit delay module 252, a beam pattern former 256, a frequency dependent beam shifter 258, a multi-carrier modulator 262, a front end interface 266 and two antennas $268_1$ and $268_2$. Transmit delay module 252 includes a single first delay module 254. Frequency dependent beam shifter 258 includes a single angular shift delay module 260. Multi-carrier modulator 262 includes first modulator $264_1$ and second modulator $264_2$ each associated with a respective sub-carrier frequency. Beam pattern former 256 is coupled with first delay module 254 and with angular shift delay module 260 and with first modulator $264_1$. Front end interface 266 is coupled with each of antennas $268_1$ and $268_2$ and with each of first modulator $264_1$ and second modulator $264_2$. Second modulator $264_2$ is further coupled with angular shift delay module 260. In system 250, beam pattern former 256 is implemented as a two by two rotation matrix as follows:

$$W_1 = \frac{1}{\sqrt{2}} \begin{bmatrix} 1 & 1 \\ 1 & -1 \end{bmatrix} \quad (5)$$

System 250 is an exemplary implementation of system 200 (FIG. 3) with two beams (i.e., N=2) where one beam does not exhibit a spatial delay and the other exhibits a spatial time delay of $T_1$. Furthermore, the direction of the two beams is shifted in frequency according to the delay introduced by angular shift delay module 260. Transmit delay module 252, beam pattern former 256 and frequency dependent beam shifter 258 may all be implemented as two time-domain filters exhibiting the following impulse response:

$$h_1(t) = \frac{1}{\sqrt{2}}[\delta(t) + \delta(t - T_1)] \quad (6)$$

$$h_2(t) = \frac{1}{\sqrt{2}}[\delta(t - D_1) - \delta(t - T_1 - D_1)] \quad (7)$$

Figure 4B:
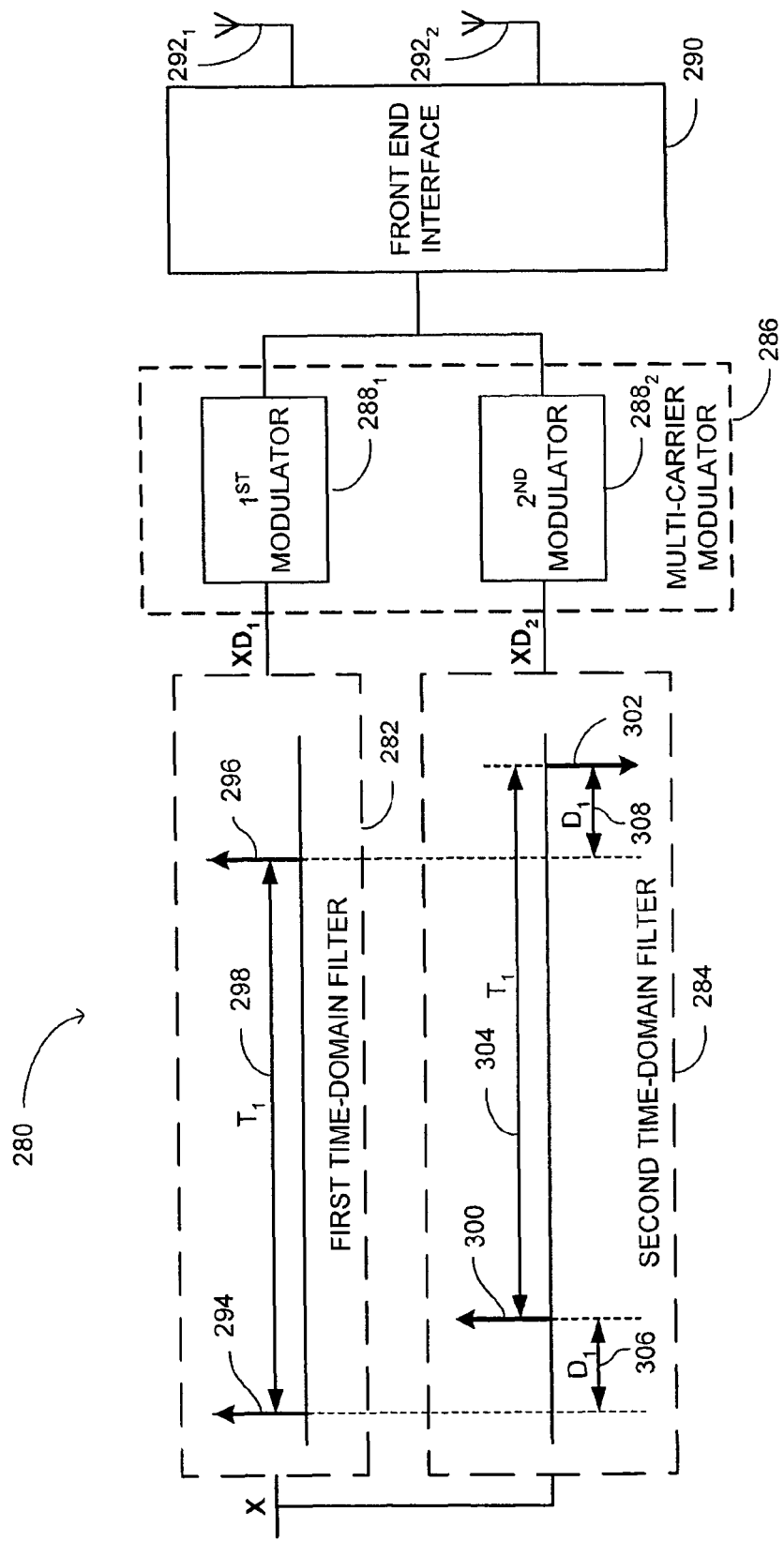
FIG. 4B, which is a schematic illustration of a system for employing spatial delay diversity with carrier frequency dependent beam direction shifting, constructed and operative in accordance with another embodiment of the disclosed technique.

Reference is now made to FIG. 4B, which is a schematic illustration of a system, generally referenced 280, for employing spatial delay diversity with carrier frequency dependent beam direction shifting, constructed and operative in accordance with another embodiment of the disclosed technique. In system 280, the delay diversity and carrier frequency dependent beam direction shifting is implemented using two time-domain filters exhibiting the impulse response of equations (6) and (7). System 280 includes first time-domain filter 282, second time-domain filter 284, multi-carrier modulator 286 and front end interface 290 and antennas $292_1$ and $292_2$. Multi-carrier modulator 286 includes a first modulator $288_1$ and a second modulator $288_2$ each associated with a respective sub-carrier frequency. First modulator $288_1$ is coupled with front end interface 288 and with first time-domain filter 282. Second modulator $288_2$ is coupled with front end interface 288 and with second time-domain filter 282. Front end interface 290 is further coupled with each of antennas $292_1$ and $292_2$.

First time-domain filter 282 is associated with the impulse response of equation (6) and second time-domain filter 284 is associated with the impulse response of equation (7). In FIG. 4B first time-domain filter 282 and second time-domain filter 284 are depicted as the graphical representations of the respective impulse responses thereof. Accordingly, an arrow 294 represents $\delta(t)$ (i.e., a delta function with no delay) in equation (6) and an arrow 296 represents $\delta(t-T_1)$ (i.e., a delta function with a delay of $T_1$) in equation (6). An arrow 300 represents $\delta(t-D_1)$ (i.e., a delta function with a time delay of $D_1$) in equation (7) and an arrow 302 represents $\delta(t-T_1-D_1)$ (i.e., a delta function with a time delay of $T_{1+}D_1$) in equation (7). Arrows 298 and 304 represent a time delay of $T_1$ (i.e., corresponding to first delay $T_1$ in FIG. 4A). Arrows 306 and 308 represent a time delay of $D_1$ (i.e., corresponding to angular shift delay $D_1$ in FIG. 4A).

Signal X is provided to first time-domain filter 282 and to second time-domain filter 284. Signal X is convolved with the impulse response of first time-domain filter 282 and with the impulse response of second time-domain filter 284. First time-domain filter 282 produces a respective signal corresponding to the sum of two copies of signal X with a delay of $T_1$ there between. Second time-domain filter 284 produces a respective signal corresponding to the sum of a copy of signal X and an inverted copy of signal X. The copy of signal X and the inverted copy of signal X corresponding to second time-domain filter 284 exhibit a time delay of $T_1$ there between and a time delay of $D_1$, relative to the copies produced by first time-domain filter 282. Thus, first time-domain filter 282 produces signal $XD_1$ and second time-domain filter 284 produces signal $XD_2$. First time-domain filter 282 provides signal $XD_1$ to first modulator $288_1$ and second time-domain filter 284 provides signal $XD_2$ to second modulator $288_2$. First modulator $288_1$ modulates the respective sub-carrier frequency thereof with signal $XD_1$. Second modulator $288_2$ modulates the respective sub-carrier frequency thereof with signal $XD_2$. First modulator $288_1$ and second modulator $288_2$ provide the modulated signals to front end interface 290. Front end interface 290 performs operations such as up-conversion, filtering and the like and transmits the signals via antennas $292_1$ and $292_2$.

The system, according to the disclosed technique, may be adapted for transmitting a plurality of signals. Thus, each signal is transmitted over a plurality of beams at time delays associated with these beams. Each beam is directed toward a different direction. Furthermore, the direction of each beam shifts for each sub-carrier relative to the other sub-carriers.

Figure 5:
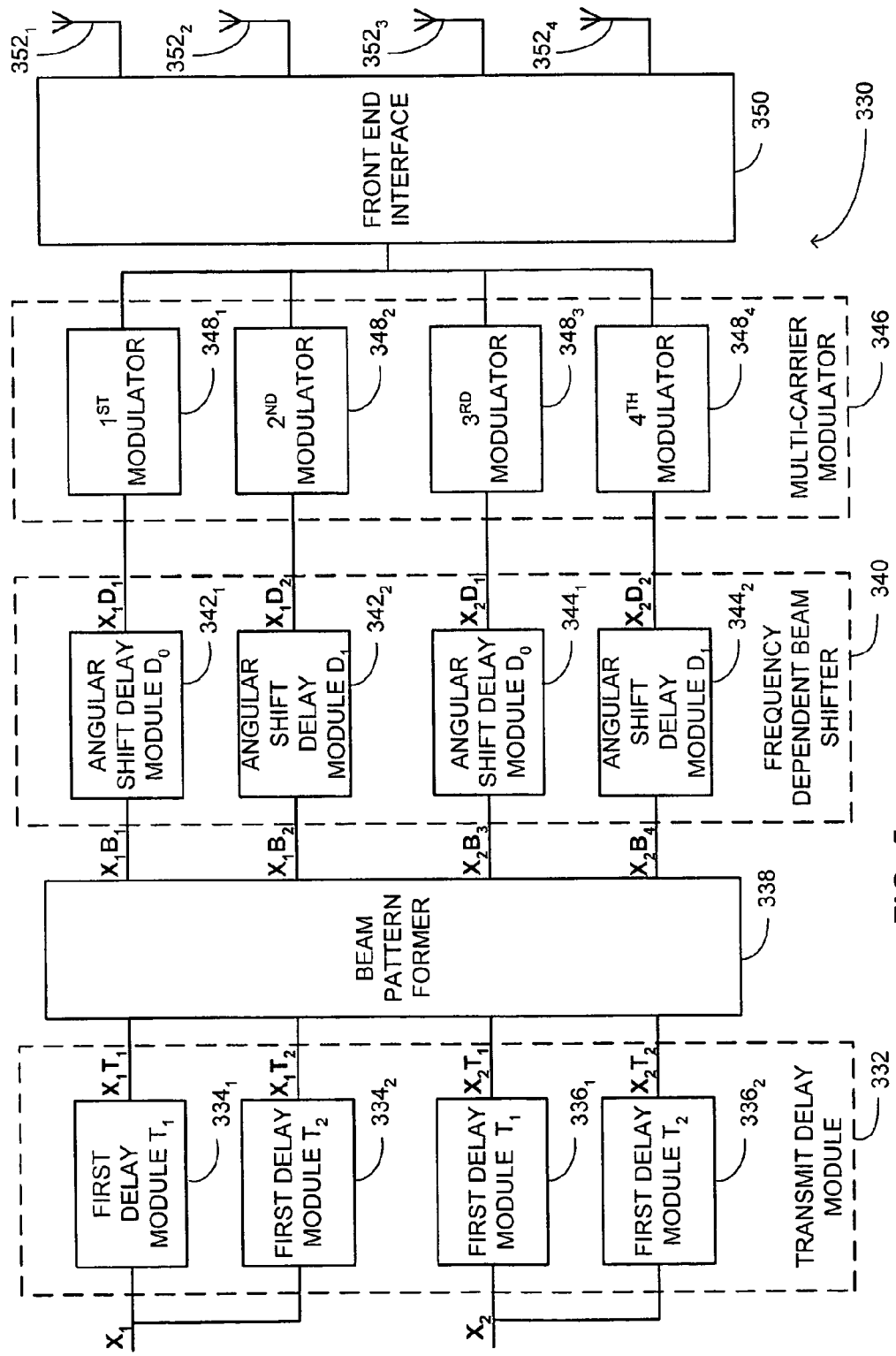
FIG. 5 is a schematic illustration of a system for employing spatial delay diversity with frequency dependent beam direction shifting, constructed and operative in accordance with a further embodiment of the disclosed technique.

Reference is now made to FIG. 5, which is a schematic illustration of a system, generally reference 330, for employing spatial delay diversity with frequency dependent beam direction shifting, constructed and operative in accordance with a further embodiment of the disclosed technique. System 330 transmits according to a multi-carrier transmission scheme. In system 330, each of the two signals, $X_1$ and $X_2$, is transmitted over two carrier signals and two beams. Each of signals $X_1$ and $X_2$ includes a plurality of symbols, each associated with the same symbol period. System 330 includes a transmit delay module 332, a beam pattern former 338, a frequency dependent beam shifter 340, a multi-carrier modulator 346, a front end interface 348 and a plurality of antennas $352_1$-$352_4$. In system 330, transmit delay module 332 includes first delay modules $334_1$ and $334_2$ associated with signal $X_1$ and first delay modules $336_1$ and $336_2$ associated with signal $X_2$. Frequency dependent beam shifter 340 includes angular shift delay modules $344_1$ and $344_2$ associated with signal $X_1$ and angular shift delay modules $346_1$ and $346_2$ associated with signal $X_2$. Multi-carrier modulator 346 includes a first modulator $348_1$, a second modulator $348_2$ a third modulator $348_3$ and a fourth modulator $348_4$, each associated with a respective sub-carrier frequency.

Beam pattern former 388 is coupled with each of first delay modules $334_1$, $334_2$, $336_1$ and $336_2$ and with each of angular shift delay modules $342_1$, $342_2$, $344_1$ and $344_2$. Front end interface 350 is coupled with each of antennas $352_1$-$352_4$ and with each of modulators $348_1$-$348_4$. Modulator $348_1$ is further coupled with angular shift delay modules $342_1$. Modulator $348_2$ is further coupled with angular shift delay modules $342_2$. Modulator $348_3$ is further coupled with angular shift delay modules $344_1$. Modulator $348_4$ is further coupled with angular shift delay modules $344_2$.

Signal $X_1$ is provided to each of first delay modules $334_1$ and $334_2$. Signal $X_2$ is provided to each of first delay modules $336_1$ and $336_2$. First delay modules $334_1$ and $334_2$ delay signal $X_1$ by corresponding first time delays $T_1$ and $T_2$. First delay modules $336_1$ and $336_2$ delay signal $X_2$ by corresponding first time delays $T_1$ and $T_2$. First delay modules $334_1$ and $334_2$ produce signals $X_1T_1$ and $X_1T_2$ respectively and provide these signals to beam pattern former 338. First delay modules $336_1$ and $336_2$ produce signals $X_2T_1$ and $X_2T_2$ respectively and provide these signals to beam pattern former 338. $X_1T_1$ and $X_1T_2$ are delayed copies of signal $X_1$ and $X_2T_1$ and $X_2T_2$ are delayed copies of signal $X_2$.

Beam pattern former 338 adjusts (e.g., multiplying by a weighting factor) each of $X_1T_1$, $X_1T_2$, $X_2T_1$ and $X_2T_2$ and produces transmit signals $XB_1$-$XB_4$. Transmit signals $XB_1$-$XB_4$ correspond to a beam pattern (i.e., the number of beams, the corresponding direction of each beam and the width of each beam). When transmit signals $XB_1$-$XB_4$ create the beams, each beam is created with its corresponding spatial direction and its respective time delay. Beam pattern former 338 produces transmit signals $X_1B_1$ and $X_1B_2$ associated with signal $X_1$ and transmit signals $X_2B_3$ and $X_2B_4$ associated with signal $X_2$. Beam pattern former 338 provides transmit signal to $X_1B_1$ to angular shift delay module $342_1$ and signal $X_1F_2$ to angular shift delay module $342_2$. Beam pattern former 338 further provides signal to $X_2B_3$ to angular shift delay module $344_1$ and signal $X_2B_4$ to angular shift delay module $344_2$. Angular shift delay module $342_1$ delays signal $X_1B_1$ by a delay $D_1$ and produce a delayed transmit signal $X_1D_1$. Angular shift delay module $342_2$ delays signal $X_1B_2$ by a time delay $D_2$ and produce a delayed transmit signal $X_1D_2$. Angular shift delay module $344_1$ delays signal $X_2B_3$ by a time delay $D_0$ and produce a delayed transmit signal $X_2D_1$. Angular shift delay module $344_2$ delays signal $X_2B_4$ by a delay $D_1$ and produce a delayed transmit signal $X_2D_2$. Angular shift delay $342_1$ provides the delayed transmit signal $X_1D_1$ to modulator $348_1$. Angular shift delay $342_2$ provides the delayed transmit signal $X_1D_2$ to modulator $348_2$. Angular shift delay $344_1$ provides the delayed transmit signal $X_2D_1$ to modulator $348_3$. Angular shift delay $344_2$ provides the delayed transmit signal $X_2D_2$ to modulator $348_4$. Modulator $348_1$ modulates signal $X_1D_1$ by the respective carrier frequency thereof. Modulator $348_2$ modulates signal $X_1D_2$ by the respective carrier frequency thereof. Modulator $348_3$ modulates signal $X_2D_1$ by the respective carrier frequency thereof. Modulator $348_4$ modulates signal $X_2D_2$ by the respective carrier frequency thereof. Each of modulators $348_1$-$348_4$ provides the modulated signal thereof to front end interface 350. Front end interface 350 performs operations such as up-conversion, filtering and the like and transmits the signals via antennas $352_1$-$352_4$.

Figure 6:
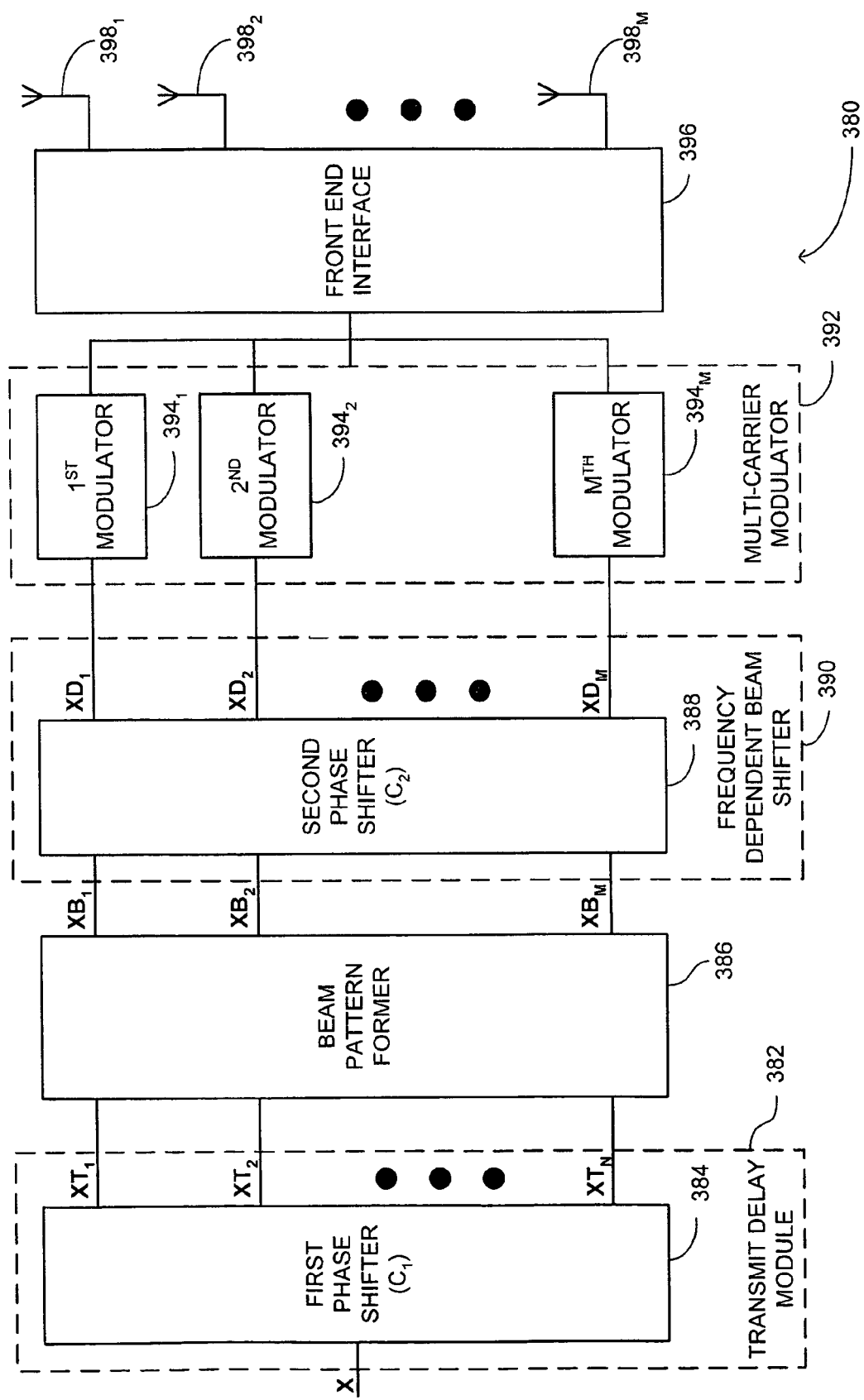
FIG. 6 is a schematic illustration of a system for employing spatial delay diversity and frequency dependent beam direction shifting, constructed and operative in accordance with another embodiment of the disclosed technique.

As mentioned above, the disclosed technique can be implemented in the frequency domain, by having the phases of the signals shifted. Accordingly, the time-delays are implemented as multiplications by a complex exponential. Reference is now made to FIG. 6, which is a schematic illustration of a system, generally reference 380, for employing spatial delay diversity and frequency dependent beam direction shifting, constructed and operative in accordance with another embodiment of the disclosed technique. System 380 is implemented in the frequency domain. System 380 includes a transmit delay module 382, a beam pattern former 386, a frequency dependent beam shifter 390, a multi-carrier modulator 392, a front end interface 396 and a plurality of antennas $398_1$-$398_M$. Transmit delay module 382 includes a first phase shifter 384. Multi-carrier modulator 392 includes a plurality of modulators $394_1$-$394_M$ each associated with a respective sub-carrier frequency. Frequency dependent beam shifter 390 includes a second phase shifter 388. Beam pattern former 386 is coupled with first phase shifter 384 and with second phase shifter 388. Front end interface 396 is coupled with each of antennas $398_1$-$398_M$ and with each of modulators $394_1$-$394_M$. Second phase shifter 388 is further coupled with each of modulators $394_1$-$394_M$.

When system 380 transmits four beams over four frequencies, first phase shifter 384 is, for example, a matrix of the form:

$$C_1 = \begin{bmatrix} 1 & 0 & 0 & 0 \\ 0 & e^{-j\omega T_1} & 0 & 0 \\ 0 & 0 & e^{-j\omega T_2} & 0 \\ 0 & 0 & 0 & e^{-j\omega T_3} \end{bmatrix} \quad (7)$$

wherein $\omega$ denotes frequency $T_n$ as defined above.

When system 380 transmits four beams over four frequencies, second phase shifter 388 is, for example, a matrix of the form:

$$C_2 = \begin{bmatrix} 1 & 0 & 0 & 0 \\ 0 & e^{-j\omega D_1} & 0 & 0 \\ 0 & 0 & e^{-j\omega D_2} & 0 \\ 0 & 0 & 0 & e^{-j\omega D_3} \end{bmatrix} \quad (8)$$

wherein $D_n$ is as defined above. Beams former 386 is similar to beam pattern former 206 described hereinabove in conjunction with FIG. 3.

A signal X is provided to first phase shifter 384. Signal X includes a plurality of symbols, each associated with the same symbol period. First phase shifter 384 shifts the phase of signal X by an angle respective of the delay of each beam. First phase shifter 384 produces signals $XT_1$-$XT_N$ and provides these signals to beam pattern former 386. $XT_1$-$XT_N$ are phase shifted copies of signal X.

Beam pattern former 386 adjusts (e.g., multiplying by a weighting factor) each of $XT_1$-$XT_N$ and produces transmit signals $XB_1$-$XB_M$. Transmit signals $XB_1$-$XB_M$ correspond to a beam pattern (i.e., the number of beams, the corresponding direction of each beam and the width of each beam). When transmitted, transmit signals $XB_1$-$XB_M$ create the beams, each beam having a corresponding spatial direction and a respective time delay. Beam pattern former 386 produces transmit signals $XB_1$-$XB_M$ and provides these signals to second phase shifter 388. Second phase shifter 388 shifts the phase of each of transmit signals $XB_1$-$XB_M$ and produces phase shifted transmit signals $XD_1$-$XD_M$. Second phase shifter 388 provides phase shifted transmit signals $XD_1$-$XD_M$ to multi-carrier modulator 392. Second phase shifter 388 provides phase shifted transmit signals $XD_1$-$XD_M$ to a corresponding one of modulators $394_1$-$394_M$ (i.e., Signal $XD_1$ is provided to modulator $394_1$, signal $XD_2$ is provided to modulator $394_2$ etc.) Each of modulator $394_1$-$394_M$ modulates each of the sub-carriers according to the corresponding signal provided thereto. Each of modulators $394_1$-$394_M$ provides the modulated signal thereof to front end interface 396. Front end interface 396 performs operations such as up-conversion, filtering and the like and transmits the signals via antennas $398_1$-$398_M$.

Figure 7:
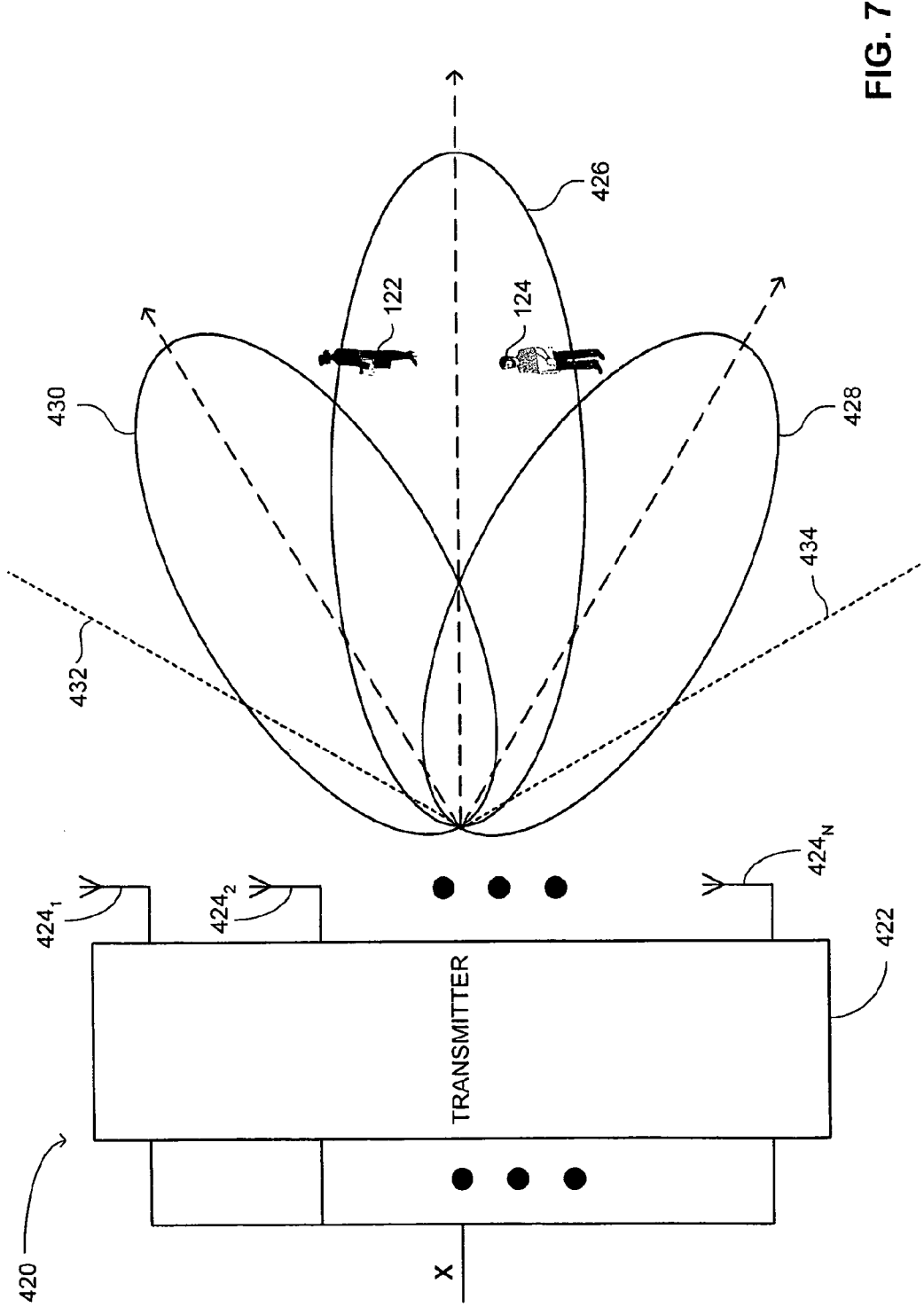
FIG. 7 which is a schematic illustration of a system for producing transmit delay diversity with frequency dependent beam direction shifting, operative in accordance with a further embodiment of the disclosed technique.

As mentioned above, the direction of each beam is essentially confined in a determined angular sector. Thus the transmitted power is concentrated only toward that determined angular sector, resulting in a transmit power gain. Reference is now made to FIG. 7 which is a schematic illustration of a system, generally referenced 420, for producing transmit delay diversity with frequency dependent beam direction shifting, operative in accordance with a further embodiment of the disclosed technique. In system 420, the direction corresponding to each beam is essentially confined in a determined angular sector. System 420 includes a transmitter 422 coupled with antennas $424_1$, $424_2$ and $424_M$. In FIG. 7 the direction of each of beams 426, 428 and 430 is essentially confined in an angular sector defined by a line 432 and a line 434. Consequently, the transmit power is concentrated only toward that angular sector resulting in a transmit power gain. Transmitter 422 produces the angular sector confined beams by employing more antennas than beams. In other words, the beam pattern former produces a larger number of transmit signals than the number of copies of the signal X. Accordingly, the beam forming matrix is non-square. For example, for producing three beams, limited within an angular sector, four antennas are used and the beam forming matrix is:

$$W = \sqrt{\frac{4}{3}} \begin{bmatrix} 1 & 1 & 1 \\ 1 & j & -j \\ 1 & -1 & -1 \\ 1 & -j & j \end{bmatrix} \quad (9)$$

wherein j represents a phase shift of $$\frac{\pi}{2}.$$

The frequency shift delay is determined to be:

$$D_n \approx \frac{(n-1)\pi/4}{BW/2} \quad (10)$$

It is noted that each of the systems described hereinabove may include additional components such as Forward Error Correction (FEC) encoder (e.g., convolutional encoder Reed-Solomon encoder and the like) and a base band modulator (e.g., Quadrature Amplitude Modulator—QAM, Phase Shift Keying—PSK modulator and the like) placed before the transmit delay module.

Figure 8:
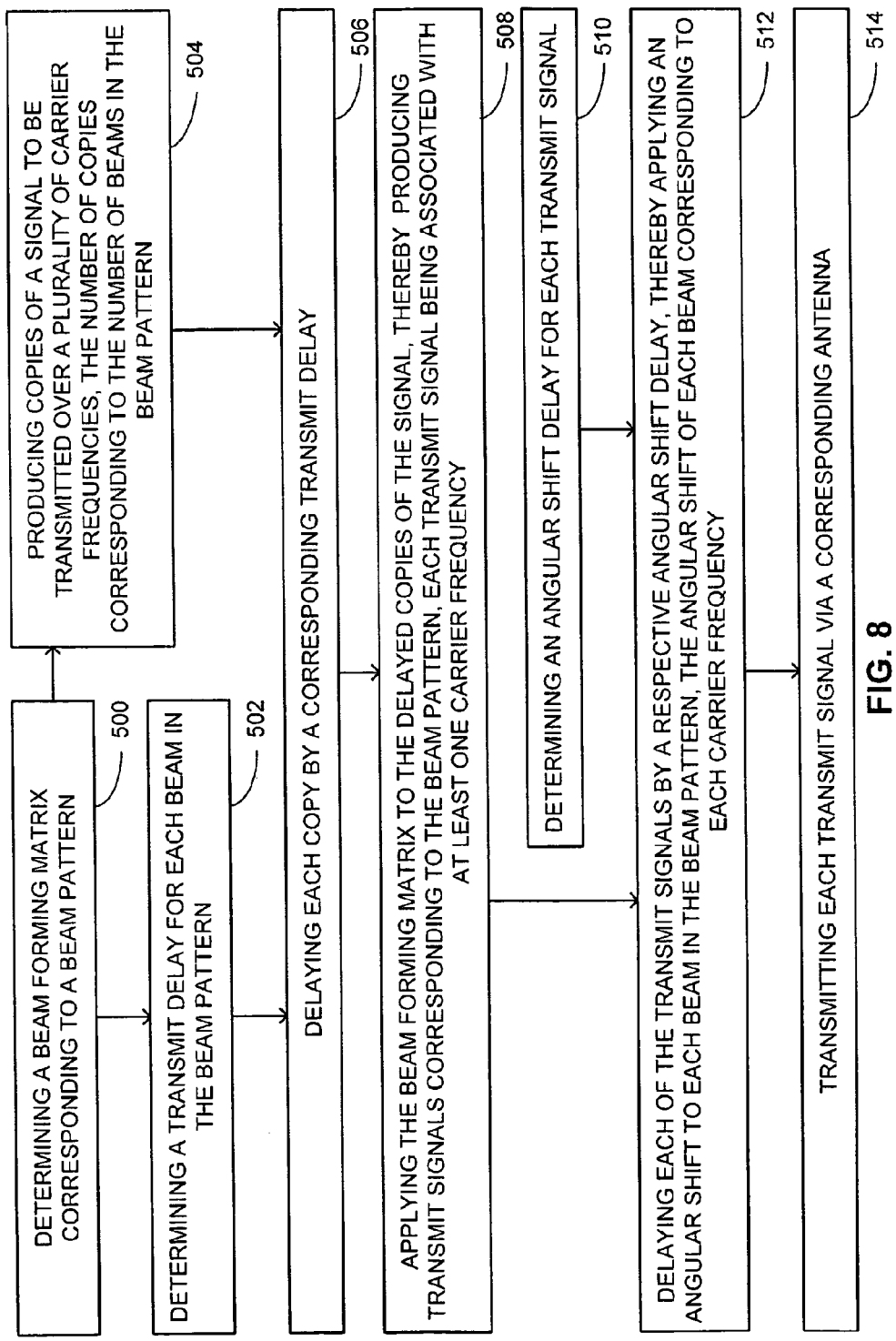
FIG. 8 which is a schematic illustration of a method for producing beam delay diversity with frequency dependent beam direction shifting, operative in accordance with another embodiment of the disclosed technique.

Reference is now made to FIG. 8, which is a schematic illustration of a method for producing beam delay diversity with frequency dependent beam direction shifting, operative in accordance with another embodiment of the disclosed technique. In procedure 500, a beam forming matrix is determined. The beam forming matrix corresponds to a determined beam pattern. The method proceeds to procedures 502 and 504.

In procedure 502, a transmit delay is determined for each beam in the beam pattern. The method proceeds to Procedure 506.

In procedure 504, copies of the signal are produced. The signal is to be transmitted over a plurality of carrier frequencies. The number of copies corresponds to the number of beams in the beam pattern.

In procedure 506, each copy of the signal is delayed by a corresponding transmit delay. With reference to FIG. 3, transmit delay module 202 delays each copy of signal X by a corresponding transmit delay $T_1$-$T_N$ associated with first delay modules $204_1$-$204_N$. In procedure 508, the beam forming matrix is applied to the delayed copies of the signal, thereby producing transmit signals corresponding to the beam pattern. It is noted that each transmit signal is associated with at least one carrier frequency. With reference to FIG. 3, beam pattern former 206 produces transmit signals $XB_1$-$XB_M$. Transmit signals $XB_1$-$XB_M$ correspond to the beam pattern. The method proceeds to procedure 512.

In procedure 510, an angular shift delay is determined for each transmit signal. It is noted that procedure 510 is independent from any of the preceding procedures.

In procedure 512, each of the transmit signals is delayed by a respective angular shift delay. Thereby an angular shift is applied to each beam in the beam pattern. The angular shift of each beam corresponds to each carrier frequency. With reference to FIG. 3, frequency dependent beam shifter 210 delays each of transmit signals $XB_1$-$XB_M$ by a respective angular shift delays $D_1$-$D_M$ associated with angular shift delay modules $208_1$-$208_M$.

In procedure 514, each transmit signal is transmitted via a corresponding antenna. With reference to FIG. 3, angular shift delay modules $208_1$-$208_M$ provide delayed transmit signals $XD_1$-$XD_M$ to multi-carrier modulator 212. Multi-carrier modulator 212 modulates each of the sub-carriers with a respective delayed transmit signal $XD_1$-$XD_M$. Front end interface 214 transmits the signals via antennas $216_1$-$216_M$.

The multi-carrier modulator described hereinabove in conjunction with each of FIGS. 3, 4A, 4B, 5 and 6, is placed after the frequency dependent beam shifter. It is, However, noted that, as described above in conjunction with FIG. 3, the multi-carrier modulator may be placed before the transmit delay module. Additionally, it is noted that each of the delays described hereinabove may be implemented as a digital delay or an analog delay. Furthermore, the delays may be cyclic delays. A cyclic delay is achieved by cyclically shifting a symbol within the symbol period. Thus, the delay spread of the received signal remains unchanged. It is further noted that the system according to the disclosed technique, described hereinabove is especially effective when the antennas in the antenna array are correlated (i.e., the spacing between the antennas is small or a Line Of Sight (LOS) exists between the transmitter and receiver. However, the system according to the disclosed technique may employ antenna arrays, wherein the spacing between two adjacent antennas is substantially large and no LOS exists between the transmitter and receiver.

It will be appreciated by persons skilled in the art that the disclosed technique is not limited to what has been particularly shown and described hereinabove. Rather the scope of the disclosed technique is defined only by the claims, which follow.

The invention claimed is:

1. In a wireless transmission system including a transmit delay module, delaying each of at least one copy of a signal by a respective delay, the signal being transmitted over a plurality of carrier frequencies and over at least one beam, the at least one beam exhibiting a beam pattern, the number of copies of the signal corresponding to the number of beams, each said at least one copy being associated with a respective one of said at least one beam, said system further including a beam pattern former, coupled with said transmit delay module, producing a plurality of transmit signals corresponding to the beam pattern, a frequency dependent beam shifter, coupled with the beam pattern former, delaying each of the at least one transmit signal by a respective angular shift delay, thereby applying an angular shift to each of the at least one beam, the angular shift of each of the at least one beam corresponding to at least a respective one of the carrier frequencies, wherein each beam is transmitted with a delay corresponding to the transmit delay of each said copy.

2. The device according to claim 1, wherein said frequency dependent beam shifter module includes a plurality of angular shift delay modules, each of said angular shift delay modules being coupled with said beam pattern former, each of said angular shift delay modules, delaying a respective transmit signal by a respective time delay.

3. The device according to claims 2, wherein each said respective time delays is on the order of a signal sample period associated with said signal.

4. The device according to claim 2, wherein each of said angular shift delay modules cyclically delays said respective transmit signal.

5. The device according to claim 1, wherein said frequency dependent beam shifter includes a phase shifter, coupled with said beam pattern former, said phase shifter shifting the phase of each of said at least one transmit signal.

6. A wireless transmission system comprising:
a transmit delay module, delaying each of at least one copy of a signal by a respective delay, said signal being transmitted over a plurality of carrier frequencies and over at least one beam, said at least one beam exhibiting a beam pattern, the number of copies of said signal corresponding to the number of beams, each said at least one copy being associated with a respective one of said at least one beam;
a beam pattern former, coupled with said transmit delay module, producing a plurality of transmit signals corresponding to said beam pattern; and
a frequency dependent beam shifter, coupled with said beam pattern former, delaying each of said transmit signals by a respective angular shift delay, thereby applying an angular shift to each of said at least one beam, the angular shift of each of said at least one beam corresponding to at least a respective one of said carrier frequencies,
wherein each beam is transmitted with a delay corresponding to the transmit delay of each said copy.

7. The system according to claim 6, wherein said transmit delay module includes a plurality of first delay modules, each of said first delay modules is coupled with said beam pattern former, each of said first delay modules, delays a respective copy of said signal by a respective first time delay.

8. The system according to claim 7, wherein each said respective first time delays is larger than a signal sample period associated with said signal.

9. The system according to claim 7, wherein each of said first delay modules cyclically delays each said respective copy of signal.

10. The system according to claim 6, wherein said transmit delay module includes a phase shifter, coupled with said beam pattern former, said phase shifter shifting the phase of each of said copies of said signal by a respective phase shift.

11. The system according to claim 6, wherein said beam pattern former adjusts each of the delayed copies of said signal.

12. The system according to claim 11, wherein said beam pattern former includes a beam forming matrix.

13. The system according to claims 12, wherein said beam forming matrix is an orthonormal rotation matrix.

14. The system according to claim 12, wherein said beam pattern former forms said beam pattern by multiplying said delayed copies of said signal by said beam forming matrix.

15. The system according to claim 6, wherein the directions of said at least one beam of said beam pattern is essentially confined in an angular sector.

16. The system according to claim 15, wherein said beam pattern former produces said beam pattern, which exhibits said at least one beam essentially confined in said angular sector, by producing a larger number of said transmit signals then said copies of said signal.

17. The device according to claim 6, wherein said frequency dependent beam shifter includes a plurality of angular shift delay modules, each of said angular shift delay modules being coupled with said beam pattern former, each of said angular shift delay modules, delaying a respective one of said transmit signals by a respective angular shift delay.

18. The system according to claims 17, wherein each of said respective time delay is on the order of said signal sample period.

19. The system according to claims 17, wherein each of said angular shift delay modules cyclically delays said respective one transmit signal.

20. The device according to claim 6, wherein said frequency dependent beam shifter includes a phase shifter, coupled with said beam pattern former, said phase shifter shifting the phase of each of said at least one transmit signal.

21. The system according to claim 6, wherein said transmit delay module, said beam pattern former and said frequency dependent beam shifter are formed of a plurality of time-domain filters, the number of said time-domain filters corresponds to the number of beams in said beam pattern, the impulse response of said time-domain filters corresponds to said beam pattern, each said impulse response of each said time-domain filter is delayed by a corresponding angular shift delay.

22. Method for transmitting a signal over a plurality of carrier frequencies and a plurality of beams, the beams exhibiting a beam pattern, the method comprising the procedures of:
delaying each copy of the signal by a corresponding transmit delay;
applying a beam forming matrix to the delayed copies of the signal, thereby producing transmit signals corresponding to the beam pattern, each transmit signal being associated with at least one carrier frequency; and
delaying each of said transmit signals by a respective angular shift delay, thereby applying an angular shift to each beam in the beam pattern, said angular shift of each beam corresponding to each carrier frequency.

23. The method according to claim 22, further including the preliminary procedures of:
producing copies of the signal to be transmitted over said plurality of carrier frequencies, the number of said copies corresponding to the number of said beams in a beam pattern; and
determining a transmit delay for each of said beams in said beam pattern.

24. The method according to claim 23, further including, prior to said procedures of producing copies and determining a transmit delay, the procedure of determining said beam forming matrix corresponding to said beam pattern.

25. The method according to claim 22, further including, prior to said procedure of delaying each of said transmit signals by a respective angular shift delay, the procedure of determining an angular shift delay for each of said transmit signals.

26. The method according to claim 22, further including the procedure of transmitting each of said transmit signal via a corresponding antenna, after said procedure of delaying each of said transmit signals by a respective angular shift delay.

* * * * *